Sept. 27, 1949.   C. E. GARDNER ET AL   2,483,339
APPARATUS FOR LATERALLY STRETCHING CONTINUOUS SHEETS
Filed Jan. 6, 1948   2 Sheets-Sheet 1
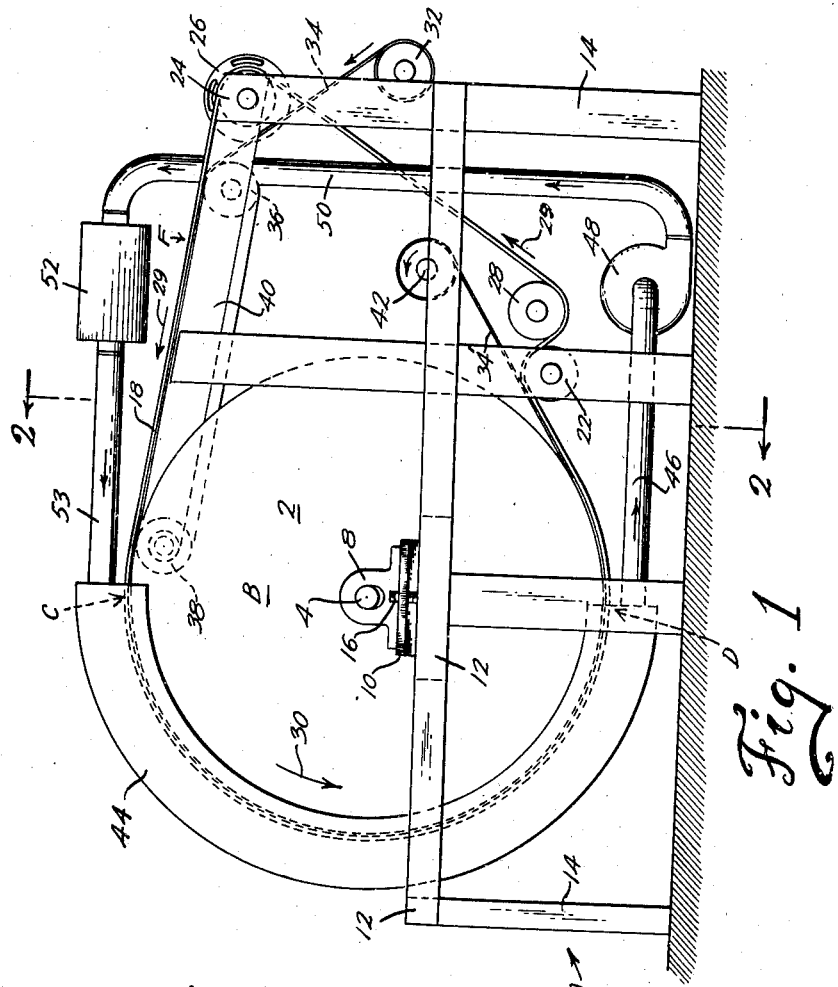
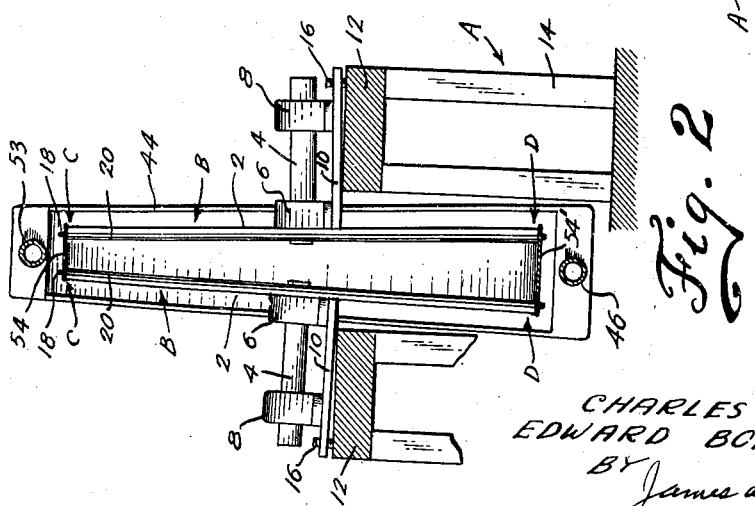
INVENTORS
CHARLES E. GARDNER
EDWARD BOYD GARDNER
BY James and Franklin
ATTORNEY Sept. 27, 1949.       C. E. GARDNER ET AL        2,483,339
         APPARATUS FOR LATERALLY STRETCHING CONTINUOUS SHEETS
Filed Jan. 6, 1948                                 2 Sheets-Sheet 2
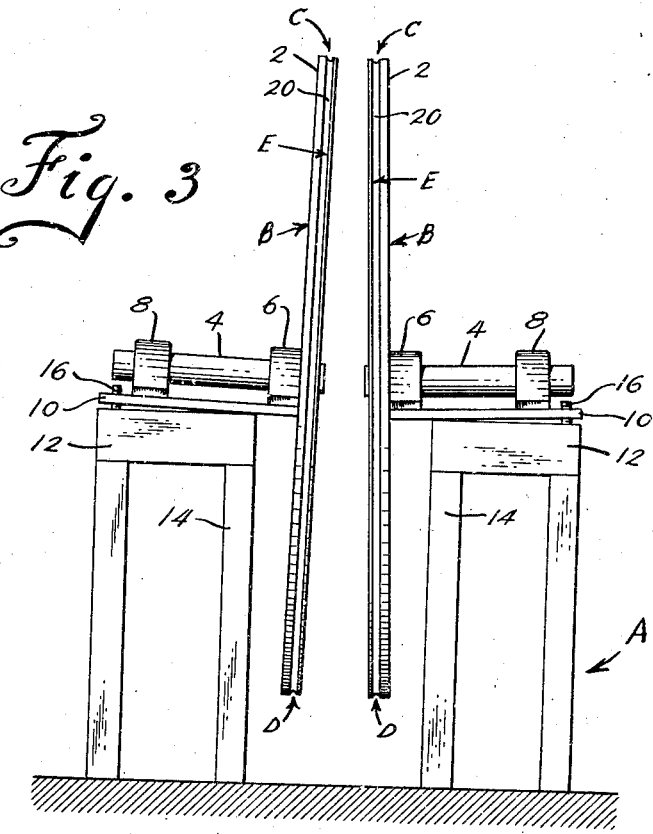
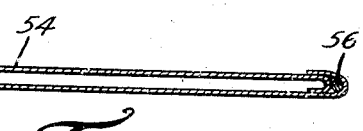
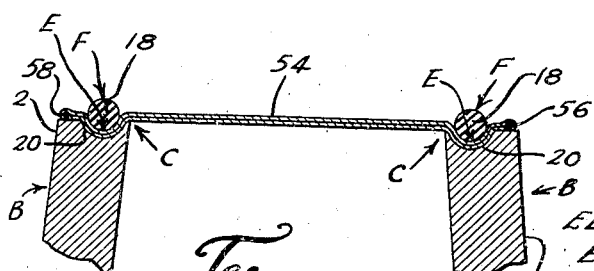
INVENTORS
CHARLES E. GARDNER
EDWARD BOYD GARDNER
BY James and Franklin
ATTORNEY

UNITED STATES PATENT OFFICE 2,483,339

APPARATUS FOR LATERALLY STRETCHING CONTINUOUS SHEETS

Charles E. Gardner, Hollis, and Edward Boyd Gardner, Williston Park, N. Y., assignors to Gardner Industrial Associates, Inc., Hollis, N. Y., a corporation of New York Application January 6, 1948, Serial No. 768

10 Claims. (Cl. 18—19)

This invention relates to apparatus for laterally stretching continuous sheets, and in particular for laterally stretching thermoplastic sheets.

It is often desired to stretch thermoplastic continuous sheets such as rubber hydrohalide films, some of which are sold under the trade name "Pliofilm," in a lateral direction. Various more or less complicated machines have been devised for this purpose, but all are subject to such operating deficiencies as to render them incapable of practical operation except under particularly favorable circumstances and for specific applications. The standard type of machine heretofore utilized for this purpose has been the so-called tentering machine as illustrated in Wiley Patent No. 2,412,187 of December 3, 1946. In this type of machine, movable individual grippers are provided for grasping and holding the edges of the sheet to be stretched, these grippers being caused to diverge as they move along with the sheet so as to stretch the same. The defects of this type of apparatus, viewed broadly, are two-fold: The lateral stretching is uneven because the edges of the sheet are not gripped all along their length but only at separated points therealong, and the gripper leaves a mark or distortion on the edge which is most undesirable and which often must be trimmed off after the stretching operation.

A second type of known lateral stretching machine is that illustrated in Minich Patent No. 2,334,022 of November 9, 1943, in which the edges of the sheet to be stretched are grasped between pairs of endless belts. This eliminates the drawbacks of the tentering machine above described but is in turn subject to another serious disadvantage, to wit, the gripping force exerted by the belts is but minimal, and unless the thermoplastic film is heated to a very high degree so as to render it extremely soft and thus to decrease its resistance to lateral stretching, the belts will fail to hold the edges of the sheet and consequently the stretching operation will fail.

It is the prime object of the present invention to devise a machine which eliminates the disadvantages of the two previously known types of lateral stretching machines.

It is a further object of the present invention to devise a machine for laterally stretching continuous sheets which is simple of construction, relatively positive in operation, and readily adjustable as to the degree of stretching desired.

Our machine is particularly adapted to the stretching of "Pliofilm" sausage casings such as are described in Goodman Patent No. 2,384,462 of September 11, 1945. Such a casing is formed of a thermoplastic or thermostretchable sheet such as "Pliofilm" made up into a flattened cylinder and provided along its length with a pair of cords the function of which is to prevent or limit the stretching and shrinking of the casing in a longitudinal direction without affecting its lateral or circumferential stretching or shrinking. It is essential that these casings be stretched before the meat is placed therein so that there is room for the meat and so that, after the meat has been cooked therein, the casing will contract readily around the meat. Since "Pliofilm" and other sheets, such as vinyl halide, will, after being properly initially stretched, tend to contract upon reheating, they are particularly suitable for this use.

There are two primary reasons why casings of this nature cannot be heated to a very high degree during their stretching. In the first place, they are stretched in a flattened condition so that they define in reality a two-ply structure and if the temperature to which they are subjected during stretching is too high, these two plies will tend to coalesce or weld themselves together, thus destroying the useability of the casing. Moreover, it has been found that the higher the temperature at which the casing is stretched, the less is its tendency to shrink upon being reheated when the meat is cooked. The strength and magnitude of this shrinking tendency is directly related to the advantageousness of the use of such sheets for meat casings.

It is therefore necessary, when stretching meat casings of this nature, that they be stretched at as low a temperature as practicable, and particularly at a temperature below that at which coalescing of the two layers will take place. This necessarily means that a greater stretching force must be applied to such casings than to single sheets with which the above considerations do not obtain.

It will therefore be apparent that neither of the two above-described known machines for laterally stretching thermostretchable sheets can be used with casings of the type under discussion. The tentering machine, since it mars the edges of the casing, sometimes even to the extent of perforating the same, would completely destroy the useability of the casing. The two belt machine disclosed in Patent No. 2,334,022 is not capable of gripping the edges of the casing with sufficient force to effect its lateral stretching at the low temperatures which must be applied to the casing during its lateral stretching.

It is an object of the present invention to devise a machine particularly adapted for the stretching of thermoplastic meat casings, this machine being capable of gripping the edges of the casing with sufficient force to stretch the same under the low temperatures to which it is subjected without marring those edges or otherwise destroying the utility of the casing.

In the past, because of the impossibility of using any of the prior art lateral stretching machines for casings of this type, the unstretched casings have first been cut into appropriate lengths and then each casing is individually stretched by inserting a pair of tongs therein, dipping the tongs and casing into water of suitable temperature, and then expanding the tongs so as to expand the casing. At the end of this operation, the stretched casing must be removed from the tongs and the tongs reinserted into a new unstretched casing. The disadvantages of this crude method of operation are obvious. The time consumed in removing and in placing the casing on the tongs, heating it, stretching it, and then removing it from the tongs makes production extremely slow. Moreover, since each tong requires the operation of an individual workman, the labor cost per casing will be seen to be exceedingly high. Until our invention there has never been a practical method or apparatus for stretching these casings in a continuous manner.

It is therefore still another object of the present invention to devise a machine which will stretch continuous lengths of sausage casings at a rapid rate, the casings after being stretched, being reeled up for storage or being cut into individual lengths as desired.

To the accomplishment of the foregoing objects and such other objects as may hereinafter appear, the present invention relates to a machine for laterally stretching continuous sheets as defined in the appended claims and as set forth in this specification, taken together with the accompanying drawings, in which:

Fig. 1 is a side view of the machine of the present invention;

Fig. 2 is a cross-sectional view thereof taken along the line 2—2 of Fig. 1, with part of the frame removed;

Fig. 3 is a view of a portion of the machine showing the rigid rotatable elements and their mounting;

Fig. 4 is a cross-sectional view on an enlarged scale of a portion of these rigid rotatable elements showing the manner in which the film to be stretched is releasably attached thereto; and Fig. 5 is a view on an enlarged scale of a type of meat casing particularly adapted for use with this invention.

It will be understood that while, throughout the subsequent description, the use of a meat casing of the type shown in Patent No. 2,384,462 is specifically disclosed, our machine is capable of use with other specific forms of thermostretchable sheets and, indeed, with any form of stretchable sheet whatsoever.

The machine of the present invention comprises a frame generally designated A on which are mounted a pair of rigid rotatable elements, generally designated B, each mounted opposite the other and diverging therefrom so that they are relatively close together at a pair of points generally designated C and relatively widely spaced at a pair of points generally designated D. Each of the rotatable elements B is provided with a sheet supporting surface generally designated E on which a portion of the sheet to be stretched is receivable and supportable. A pair of flexible elements F are provided each engageable with a sheet supporting surface E relatively close to the point C and disengageable therefrom at or close to the point D. The sheet to be stretched is adapted to be received between the flexible elements F and the corresponding sheet supporting surfaces E and to be retained therebetween until the flexible elements F and the sheet supporting surfaces E are disengaged. Means are provided for rotating the elements B so that the sheet to be stretched is moved between the points C and the points D so as to be stretched therebetween, after which the sheet is released from the machine.

In the form here specifically disclosed, the rigid rotatable elements B are shown as wheels 2 the rims of which define the sheet supporting surfaces E. Each of the wheels may be mounted for rotation about or with a shaft 4 which is journalled in bearings 6 and 8, each of which is fastened to a plate 10 which is in turn mounted on table 12 so as to be tiltable thereover. The table 12 is supported on legs 14, all of which form a part of the frame A. The tiltable mounting may be accomplished by connecting the inner end of the plates 10 to the tables 12, by means of a hinge or other equivalent mounting (not shown) and by providing each of the plates 10 at their outer end with an adjustment screw 16 the lower end of which bears upon the table 12. The wheels 2 are mounted opposite one another and by adjustment of the screw 16 the two wheels will be caused to diverge into non-parallel relationship to any desired degree. As the adjustment screws 16 are screwed through the plates 10, they will cause the outer ends of those plates to rise and consequently will bring the upper edges of the wheels 2 closer together, thus defining the relatively closely spaced points C, and will at the same time move the lower edges of the wheels 2 away from one another, thereby defining the relatively distantly spaced points D.

The flexible elements F are here illustrated as continuous cables 18 each engageable with and passable over the diverging rims of the wheels 2 between the points C and the points D. However, it will be apparent that instead of cables, belts, straps, or any other flexible elements of the same nature could be employed. In order to ensure proper registration of the cables 18 with the rims of the wheels 2, and in order further to improve and facilitate the grip between them, which grip is employed to grasp the sheet to be stretched, the rims of the wheels 2 are provided with peripheral grooves 20 into which the cables 18 partially fit.

The framework A serves as a support for guide rollers or pulleys 22 and 24 for the cables 18, one of these rollers, here shown as the roller 24, being rotated by the motor 26 so as to drive the cables 18. It is desirable that the cables 18 be tensioned during operation of the device and any suitable mechanism may be employed to this end, the weighted roller 28 in Fig. 1 accomplishing this end.

Since each of the cables 18 passes over a portion of the periphery of one of the wheels 2, preferably maintained in engagement therewith by interengagement with the grooves 20, translation of the cables 18 by means of the motor 26 will cause the wheels 2 to rotate. If the cables 18 be translated in the direction of the arrows 29 of Fig. 1, each cable 18 will move over roller 24 to the point C of a wheel 2, over the diverging periphery of the wheel 2 to the point D, thence over the guide roller 22 and under tensioning roller 28 and then back to roller 24. This will cause the wheel 2 to rotate in the direction of the arrow 30.

A reel 32 may be mounted on the framework A and on this reel the sheet 34 to be stretched may be wound. This sheet must be of a width at least equal to the spacing between the points C. Guide rollers 36 and 38 mounted at either end of supporting arm 40 on the frame A are provided for the sheet 34, leading it under the cables 18 closely adjacent to the points C, and between the cables 18 and the sheet supporting surfaces E of the wheels 2. The tension on the cables 18 will be sufficient to cause the sheet 34 to be firmly grasped between the cables 18 and the sheet supporting surfaces E, the grasp being sufficiently great so as to permit the stretching of the sheet 34 as it is carried by the cables 18 over the periphery of the wheels 2 between the points C and the points D as the wheels 2 rotate. When the cables 18 disengage themselves from the periphery of the wheels 2, the stretched sheet 34' is led to another reel 42 upon which it may be wound. Any suitable means (not shown) for tensioning this reel 42 so as to take up slack may be employed.

When thermoplastic or other thermostretchable sheets 34 are employed, it is usually necessary that heat be applied to the sheets prior to or during the stretching operation, or both, that is to say, prior to or during the period that the sheets are carried between the points C and D, or both. This may be accomplished in many ways, one of which is here specifically disclosed. An arcuate heater 44 surrounds the wheels 2 at their periphery between the points C and D, the heater transmitting heat to the film 34 as it is being stretched. As here disclosed, the heater is of the closed system hot air type, air being drawn from the heater 44 through duct 46 to blower 48 and from there via duct 50 to air heater 52, after which the air again re-enters the heater 44 via duct 53. Hot water or radiant heat heaters, among others, can also be employed, and hot air blasts on the sheet 34 itself are also feasible.

As has already been stated, this machine is particularly advantageous when employed with Pliofilm meat casings, which take the form illustrated in Fig. 5. These casings comprise a Pliofilm or other thermoplastic sheet which is folded over itself and sealed so as to define a closed container or casing 54. A cord 56 is secured between the sealed overlapping ends of the sheet 54 and another cord 58 is secured to the casing diametrically opposite to the cord 56 by means of auxiliary strip 60. The cords 56 and 58 run lengthwise with respect to the casing 54 so as to prevent longitudinal stretching or contraction, but lateral stretching of the casing is not thereby prevented.

The operation of the machine of the present invention will now be described specifically with respect to such a casing. The degree of divergence of the wheels 2 is adjusted by means of adjusting screws 16 until the distance between the points C is slightly less than the width of the flattened casing 54, which defines the sheet 34 to be stretched. A continuous length of this casing is wound upon reel 32 and its free end is led over guide rollers 36 and 38 to the points C and is there guided between the cables 18 and the peripheries of the wheels 2. The wheels are rotated and the cable is translated either manually or by a momentary driving impulse from the motor 26 so that a substantial length of the casing 54 adjacent to its side edges is gripped between the cables 18 and the wheels 2. This grip is best shown in Fig. 4, where it is seen that longitudinally disposed areas of the casing 54 closely adjacent to their edges are retained in the grooves 20 by the cables 18. The peripheral edges of the casing 54 in which the cords 56 and 58 are secured extend outwardly from the grooves 20. Since the cables 18 are tensioned, as by means of tension roller 28, they grip the portions of the casing 54 engaged between themselves and the grooves 20 with considerable force. In addition, the cords 56 and 58 in the outwardly protruding edges of the casing 54 render those edges of materially greater thickness than those longitudinal portions of the casing 54 which are grasped between the cables 18 and the wheels 2. Hence, any tendency of the casing 54 to slip from the grasp of the cable 18 during the stretching operation is materially inhibited.

Heat is applied by means of the heater 44 and the motor 26 is started. This will, via roller 24, cause the cables 18 to translate and they in turn will rotate the wheels 2. They will also, by virtue of the fact that they have already grasped the leading portion of the casing 54, act to pull the casing from the supply reel 32, unwinding the latter.

The speed with which the motor 26 is driven, which determines the speed at which the wheels 2 rotate, is determined by the degree of heat applied to the casing 54 during the time that it passes from the points C to the points D and is laterally stretched. The greater the heat, the more readily will the casing 54 stretch and consequently the more rapidly can the wheels 2 be rotated to stretch it. As set forth above, however, there are certain definite upper limitations of temperature with regard to the casings 54 such as are now specifically under discussion, these limitations being determined largely by the tendency of the overlying plies of the casing to weld together or coalesce and by the fact that the lower the temperature at which the stretching takes place, the greater is the shrinking tendency of the casing after the meat has been placed therein and cooked. The speed of rotation of the wheels 2 is also determined by the degree of stretching desired, in conjunction with the above variables. The relationship of these factors is to some extent a matter of choice and to some extent a matter of trial and error well within the ken of those skilled in the art.

After the leading edge of the casing 54 has moved to the points D, the cables 18 diverge from the periphery of the wheels 2 releasing the casing in stretched condition (see 54' of Fig. 2). It may then be led to supply reel 42 which is provided with a tensioning device (not shown) to take up the slack and the machine is run until the entire reel 32 of unstretched casing has been unwound, a reel 42 of stretched casing 54' resulting. This casing, in its continuous form, may be stored for subsequent use or may immediately be cut into appropriate lengths as desired.

Since the casing is grasped continuously along its side edges during the stretching operation, the stretching is achieved in an even and regular manner. The grip is smooth and constant all along the edges and consequently the edges are unmarred and in particular are unperforated and undamaged. Since the grip is achieved very close to the edges, the main body of the casing is stretched and only a narrow portion along the edges of the casing, that portion corresponding approximately to the width of the wheels 2, is unstretched. By means of the firm grip all along the edges, longitudinal stretching is effectively prevented even in cases where the cords 56 and 58 are not present. By providing the rims of the wheels 2 with peripheral grooves 20, not only is accurate registration of the cables 18 achieved, but a firmer grip is established on the casing 54. In addition, when the casing is provided with the cords 56 and 58, the possibility of the casing disengaging itself from the grip is negatived by the practical impossibility of the relatively thick cords 56 and 58 slipping through the grooves 20 under the cables 18. Variation in the degree of stretching is achieved in an extremely simple manner by appropriate manipulation of the adjusting screws 16. The entire stretching unit is a simple, compact assembly which is made of uncomplicated elements, which may be easily assembled, and in which replacement of parts is facilitated.

It will be apparent that many changes in design may be made from our specific disclosure, and that the machine of the present invention may be employed with many types of laterally stretchable sheets, all within the spirit of the invention as defined in the appended claims.

We claim:

1. A machine for laterally stretching continuous sheets comprising a frame, a pair of rigid rotatable elements oppositely mounted thereon in diverging relationship and each having a sheet supporting surface, a motor on said frame having a driving pulley, and a pair of continuous flexible elements each engageable over the sheet supporting surface of one of said rotatable elements at a point relatively closely spaced, and disengageable therefrom at a point relatively distantly spaced, with respect to said other sheet supporting surface, said flexible elements being adapted to grasp a portion of said sheet to be stretched between themselves and the portions of said sheet supporting surfaces with which they are engaged, said flexible elements also passing over said driving pulley in driven relationship therewith, whereby said flexible elements serve to rotate said rotatable elements and feed the sheet to be stretched.

2. A machine for laterally stretching continuous sheets comprising a frame, a pair of rigid rotatable elements oppositely mounted thereon in diverging relationship and each having a sheet supporting surface, a supply reel on said frame from which the sheet to be stretched may be unwound, a motor on said frame having a driving pulley, a pair of continuous flexible elements each engageable over the sheet supporting surface of one of said rotatable elements at a point relatively closely spaced, and disengageable therefrom at a point relatively distantly spaced, with respect to said other sheet supporting surface, guides for said flexible elements, said sheet being guided between said flexible elements and said rotatable elements at their points of engagement, said flexible elements being adapted to grasp a portion of said sheet to be stretched between themselves and portions of said sheet supporting surfaces with which they are engaged, and a reel on which the stretched sheet may be wound, said flexible elements also passing over said driving pulley in driven relationship therewith, whereby said flexible elements serve to rotate said rotatable elements and feed the sheet to be stretched.

3. A machine for laterally stretching continuous sheets comprising a frame, a pair of opposed plates tiltably connected to said frame at opposing edges, means on said plates cooperable with said frame for adjusting the degree of tilt thereof, wheels rotatably mounted on said plates with their axes of rotation substantially parallel thereto and tiltable therewith, said wheels being oppositely mounted in divergable relationship, the rims of said wheels defining sheet supporting surfaces closely spaced with respect to one another at one pair of points, and widely spaced with respect to one another at another pair of points, when said wheels are diverged by tilting of said plates, and a pair of flexible elements each engageable over the sheet supporting surface of one of said wheels at said closely spaced points and disengageable therefrom at said widely spaced points, said flexible elements being adapted to grasp a portion of the sheet to be stretched between themselves and the portions of said sheet supporting surfaces with which they are engaged, and means for rotating said wheels.

4. A machine for laterally stretching continuous sheets comprising a frame, a pair of rigid rotatable elements oppositely mounted thereon in diverging relationship and each having a sheet supporting surface, a supply reel on said frame from which the sheet to be stretched may be unwound, a motor on said frame having a driving pulley, a pair of continuous flexible elements each engageable over the sheet supporting surface of one of said rotatable elements at a point relatively closely spaced, and disengageable therefrom at a point relatively distantly spaced, with respect to said other sheet supporting surface, guides on said frame for said flexible elements, said sheet being guided between said flexible elements and said rotatable elements at their points of engagement, said flexible elements being adapted to grasp a portion of said sheet to be stretched between themselves and portions of said sheet supporting surfaces with which they are engaged, a reel on which the stretched sheet may be wound, said flexible elements also passing over said driving pulley in driven relationship therewith, and a weighted roller free to move vertically engageable with the upper surface of said flexible elements so as to tension the same, whereby said flexible elements serve to rotate said rotatable elements and feed the sheet to be stretched.

5. A machine for laterally stretching continuous sheets comprising a frame, a pair of opposed plates tiltably connected to said frame at opposing edges, means on said plates cooperable with said frame for adjusting the degree of tilt thereof, wheels rotatably mounted on said plates with their axes of rotation substantially parallel thereto and tiltable therewith, said wheels being oppositely mounted in divergable relationship, the rims of said wheels defining sheet supporting surfaces closely spaced with respect to one another at one pair of points, and widely spaced with respect to one another at another pair of points, when said wheels are diverged by tilting of said plates, a motor on said frame having a driving pulley, and a pair of flexible elements each engageable over the sheet supporting surface of one of said wheels at said closely spaced points and disengageable therefrom at said widely spaced points, said flexible elements being adapted to grasp a portion of the sheet to be stretched between themselves and the portions of said sheet supporting surfaces with which they are engaged, said flexible elements also passing over said driving pulley in driven relationship therewith, whereby said flexible elements serve to rotate said rotatable elements and feed the sheet to be stretched.

6. A machine for laterally stretching continuous sheets comprising a frame, a pair of opposed plates tiltably connected to said frame at opposing edges, means on said plates cooperable with said frame for adjusting the degree of tilt thereof, wheels rotatably mounted on said plates with their axes of rotation substantially parallel thereto and tiltable therewith, said wheels being oppositely mounted in divergible relationship, the rims of said wheels defining sheet supporting surfaces closely spaced with respect to one another at one pair of points, and widely spaced with respect to one another at another pair of points, when said wheels are diverged by tilting of said plates, a motor on said frame having a driving pulley, and a pair of flexible elements each engageable over the sheet supporting surface of one of said wheels at said closely spaced points and disengageable therefrom at said widely spaced points, said flexible elements being adapted to grasp a portion of the sheet to be stretched between themselves and the portions of said sheet supporting surfaces with which they are engaged, said flexible elements also passing over said driving pulley in driven relationship therewith, and a weighted roller free to move vertically and engageable with the top surface of said flexible elements so as to tension the same, whereby said flexible elements serve to rotate said rotatable elements and feed the sheet to be stretched.

7. A machine for laterally stretching continuous thermoplastic sheets comprising a frame, a pair of rigid rotatable elements oppositely mounted thereon in diverging relationship and each having a sheet supporting surface, a supply reel on said frame from which the sheet to be stretched may be unwound, a motor on said frame having a driving pulley, a pair of continuous flexible elements each engageable over said sheet supporting surface of one of said rotatable elements at a point relatively closely spaced, and disengageable therefrom at a point relatively distantly spaced, with respect to said other sheet supporting surface, an arcuate heating member fixed to said frame and extending around said rotatable elements between said closely spaced and distantly spaced points, said arcuate heating member encompassing said sheet supporting surfaces between said points but being spaced therefrom, guides on said frame for said flexible elements, said sheet being guided between said flexible elements and said rotatable elements at their points of engagement, said flexible elements being adapted to grasp a portion of said sheet to be stretched between themselves and portions of said sheet supporting surfaces with which they are engaged, and a reel on which the stretched sheet may be wound, said flexible elements also passing over said driving pulley in driven relationship therewith, whereby said flexible elements serve to rotate said rotatable elements and feed the sheet to be stretched.

8. The machine of claim 7, in which said arcuate heating member includes a closed conduit connected at one end to a heater and at the other end to an air pump, said pump and said heater also being connected so as to define a closed heating system.

9. A machine for laterally stretching continuous thermoplastic sheets comprising a frame, a pair of opposed plates tiltably connected to said frame at opposing edges, means on said plates cooperable with said frame for adjusting the degree of tilt thereof, wheels rotatably mounted on said plates with their axes of rotation substantially parallel thereto and tiltable therewith, said wheels being oppositely mounted in divergable relationship, the rims of said wheels defining sheet supporting surfaces closely spaced with respect to one another at one pair of points, and widely spaced with respect to one another at another pair of points, when said wheels are diverged by tilting of said plates, an arcuate heating member fixed to said frame and extending around said rotatable elements between said closely spaced and widely spaced points, said arcuate heating member encompassing said sheet supporting surfaces between said pairs of points but being spaced therefrom, and a pair of flexible elements each engageable over the sheet supporting surface of one of said wheels at said closely spaced points and disengageable therefrom at said widely spaced points, said flexible elements being adapted to grasp a portion of the sheet to be stretched between themselves and the portions of said sheet supporting surfaces with which they are engaged, and means for rotating said wheels.

10. The machine of claim 9, in which said arcuate heating member includes a closed conduit connected at one end to a heater and at the other end to an air pump, said pump and said heater also being connected so as to define a closed heating system.

CHARLES E. GARDNER.
EDWARD BOYD GARDNER.

REFERENCES CITED

The following references are of record in the file of this patent:

UNITED STATES PATENTS

| Number | Name | Date |
| --- | --- | --- |
| 461,954 | Force | Oct. 27, 1891 |
| 1,238,742 | Butler | Sept. 4, 1917 |
| 1,997,483 | Cluett | Apr. 9, 1935 |
| 2,334,022 | Minich | Nov. 9, 1943 |

FOREIGN PATENTS

| Number | Country | Date |
| --- | --- | --- |
| 8,314 | Great Britain | Apr. 6, 1906 |